(12) United States Patent
Trigano et al.

(10) Patent No.: US 12,602,907 B2
(45) Date of Patent: Apr. 14, 2026

(54) DATA SENSITIVITY ESTIMATION

(71) Applicant: Microsoft Technology Licensing, LLC, Redmond, WA (US)

(72) Inventors: David Trigano, Or Akiva (IL); Andrey Karpovsky, Kiryat Motzkin (IL); Basel Shaheen, Haifa (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 994 days.

(21) Appl. No.: 17/728,045

(22) Filed: Apr. 25, 2022

(65) Prior Publication Data

US 2023/0343072 A1 Oct. 26, 2023

(51) Int. Cl.
G06V 10/774 (2022.01)
G06F 40/20 (2020.01)
G06N 20/20 (2019.01)

(52) U.S. Cl.
CPC ............ G06V 10/774 (2022.01); G06F 40/20 (2020.01); G06N 20/20 (2019.01)

(58) Field of Classification Search
CPC ....... G06V 10/774; G06N 20/20; G06F 40/20
See application file for complete search history.

(56) References Cited

U.S. PATENT DOCUMENTS 8,463,752 B2 * 6/2013 Brinkmoeller ...... G06F 21/6254
707/662
11,475,158 B1 * 10/2022 Zhang .................. G06V 10/774

11,531,846 B1 * 12/2022 Bodapati ................ G06N 20/00
11,599,667 B1 * 3/2023 Tutuianu .................. G06N 5/04
12,073,000 B2 * 8/2024 Larson ................... G06N 20/00
2009/0163174 A1 * 6/2009 Baik ........................ H04K 3/82
455/410
2012/0101870 A1 * 4/2012 Gates ................. G06Q 10/0635
707/E17.09

(Continued)

OTHER PUBLICATIONS

Deepak Kaul et al., AI to Detect and Mitigate Security Vulnerabilities in APIs: Encryption, Authentication, and Anomaly Detection in Enterprise-Level Distributed Systems, Eigen pub Review of Science and Technology, pp. 34-62 (Year: 2021).*

(Continued)

*Primary Examiner* — Barbara M Level
(74) *Attorney, Agent, or Firm* — Ray Quinney & Nebeker P.C.; Paul N. Taylor

(57) ABSTRACT

The disclosed technology is generally directed to data classification. In one example of the technology, training data and a ground truth that indicates sensitive data within the training data is received. Based at least on the training data, natural language processing is used to learn features. The features include a naming feature that is associated with names of data resources in the training data. Based at least on the training data and the ground truth, using supervised learning, a model that is a heuristic model and/or a machine learning model is created. Input data information that is associated with input data is received. The model is used to determine a data resource sensitivity estimator (DRSE) value for each portion of the input data. The determination is based on the combination of features for the input data. Potentially sensitive data within the input data is flagged based on the DRSE values.

19 Claims, 5 Drawing Sheets

(56) References Cited

U.S. PATENT DOCUMENTS

| | | | | |
|---|---|---|---|---|
| 2014/0304821 | A1* | 10/2014 | Chari | G06F 21/577 |
| | | | | 726/25 |
| 2018/0253219 | A1* | 9/2018 | Dotan-Cohen | G06F 3/04847 |
| 2019/0370468 | A1* | 12/2019 | Soby | G06F 21/57 |
| 2020/0125746 | A1* | 4/2020 | Joshi | G06F 21/6245 |
| 2020/0242080 | A1* | 7/2020 | Dain | G06F 16/164 |
| 2020/0311304 | A1* | 10/2020 | Parthasarathy | G06F 11/3006 |
| 2021/0256156 | A1* | 8/2021 | Enuka | G06F 21/6245 |
| 2021/0390448 | A1* | 12/2021 | Krishnamoorthy | G06F 21/602 |
| 2022/0035862 | A1* | 2/2022 | Ben-Natan | G06V 10/776 |
| 2022/0382891 | A1* | 12/2022 | Shmidov | G06N 5/04 |
| 2023/0096474 | A1* | 3/2023 | Krishnan | G06N 3/0464 |
| | | | | 726/26 |
| 2023/0128136 | A1* | 4/2023 | Sahu | G06F 16/41 |
| | | | | 726/26 |
| 2024/0223726 | A1* | 7/2024 | Dotan-Cohen | H04N 7/147 |
| 2024/0403570 | A1* | 12/2024 | Mittal | G06F 40/30 |
| 2025/0014380 | A1* | 1/2025 | Mittal | G06V 30/40 |

OTHER PUBLICATIONS

Garla, et al., "Semi-Supervised Clinical Text Classification With Laplacian Svms: An Application to Cancer Case Management", In Journal of Biomedical Informatics, vol. 46, Issue 5, Oct. 1, 2013, pp. 869-875.

Kuzina, et al., "Methods for Automatic Sensitive Data Detection in Large Datasets: a Review", In Proceedings of 44th International Convention on Information, Communication and Electronic Technology (MIPRO), Sep. 27, 2021, pp. 187-192.

"International Search Report and Written Opinion Issued in PCT Application No. PCT/US23/016170", Mailed Date: Jul. 17, 2023, 15 Pages.

* cited by examiner

DATA SENSITIVITY ESTIMATION

BACKGROUND

Cloud storage typically refers to computer data storage in which the digital data is stored in logical pools on servers in the cloud. The physical storage typically spans multiple servers, sometimes in multiple locations, and the physical environment is typically owned and managed by a hosting company. Typically, people or organizations buy or lease storage capacity from the providers to store user, organization, or application data. Cloud storage services may be typically accessed through a co-located cloud computing service, a web service application programming interface (API) or by applications that use the API, such as cloud desktop storage, a cloud storage gateway, or Web-based content management systems.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to data classification. In some examples, training data and a ground truth that indicates sensitive data within the training data is received. In some examples, based at least on the training data, natural language processing is used to learn a plurality of features. In some examples, the plurality of features includes a naming feature that is associated with names of data resources in the training data. In some examples, based at least on the training data and the ground truth, using supervised learning, a model that is at least one of a heuristic model or a machine learning model is created. In some examples, input data information that is associated with input data is received. In some examples, the model is used to determine a data resource sensitivity estimator value for each portion of a plurality of portions of the input data. In some examples, the determination is based on the combination of features for the input data. In some examples, potentially sensitive data within the input data is flagged based on the determined data resource sensitivity estimator values.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
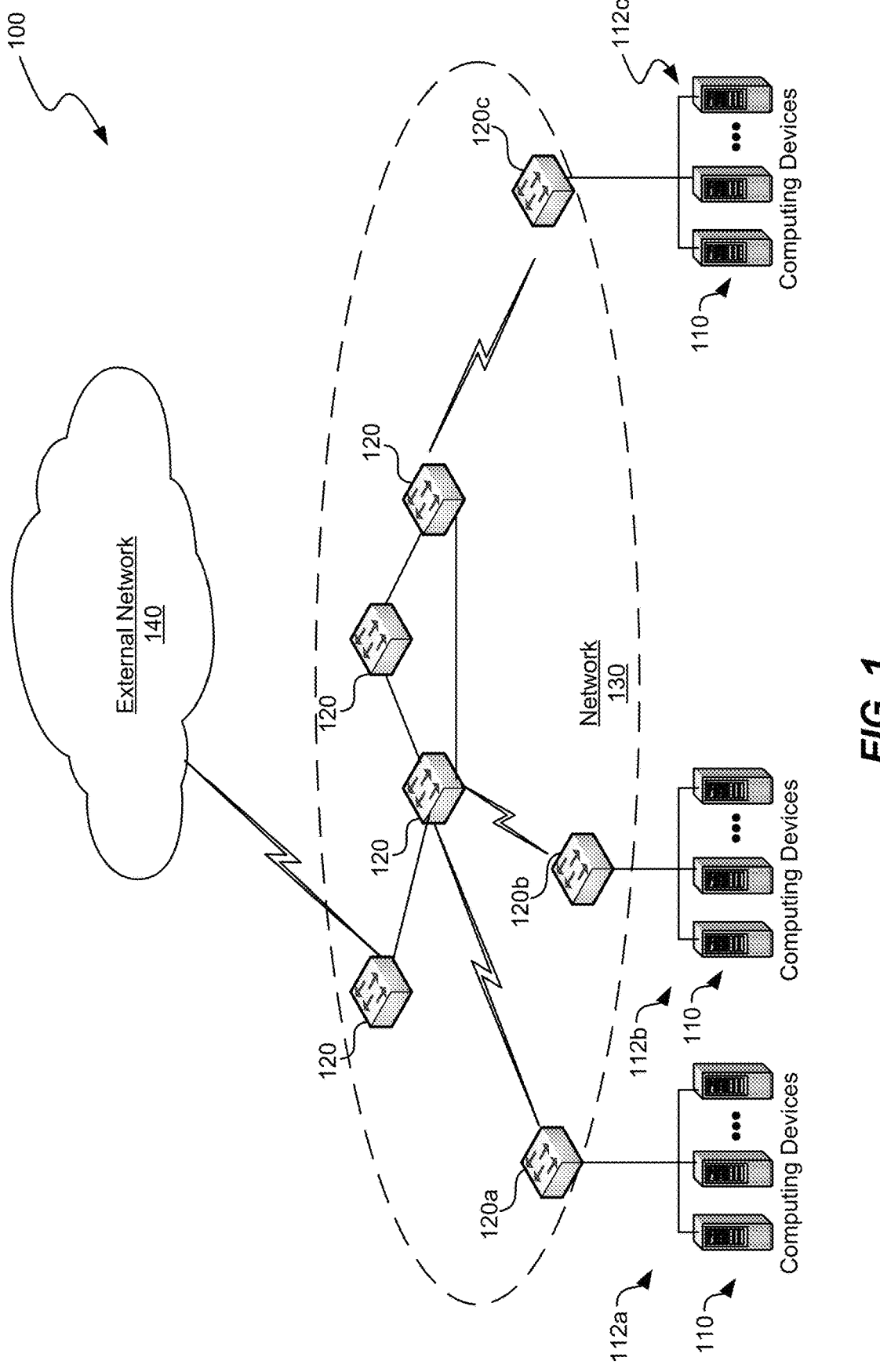
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on," and includes the option of being based on additional factors, some of which may not be described herein. As another example, the term "via" is not exclusive, and is equivalent to the term "via, at least in part," and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof. The term "cloud" or "cloud computing" refers to shared pools of configurable computer system resources and higher-level services over a wide-area network, typically the Internet. "Edge" devices refer to devices that are not themselves part of the cloud, but are devices that serve as an entry point into enterprise or service provider core networks. The term "document" refers to a sequence of words, tokens, items, properties, or other suitable units of data, where the sequence is capable of being indexed and uniquely identified.

Briefly stated, the disclosed technology is generally directed to data classification. In some examples, training data and a ground truth that indicates sensitive data within the training data is received. In some examples, based at least on the training data, natural language processing is used to learn a plurality of features. In some examples, the plurality of features includes a naming feature that is associated with names of data resources in the training data. In some examples, based at least on the training data and the ground truth, using supervised learning, a model that is at least one of a heuristic model or a machine learning model is created. In some examples, input data information that is associated with input data is received. In some examples, the model is used to determine a data resource sensitivity estimator value for each portion of a plurality of portions of the input data. In some examples, the determination is based on the combination of features for the input data. In some examples, potentially sensitive data within the input data is flagged based on the determined data resource sensitivity estimator values.

In some examples, data may be stored, where the data may include sensitive data. Sensitive data may include information that may include intellectual property, private financial information (including credit card numbers and the like); private medical information; password information; other private information associated with a customer such as passport numbers, customer names, or the like; organizational or government secrets, or the like. In some examples, the data may include a large amount of data stored in the cloud on behalf of each customer of cloud storage services for a number of different customers.

It may be desirable for a customer to know which data among their data is sensitive. One approach to determining this information may be to actively scan all of the data to determine which data is sensitive. However, this may take a significant amount of time, particularly for a large amount of data. In some examples, a prediction as to which data among the data is sensitive may be made by a data sensitivity estimation model.

The data sensitivity model may be a heuristic model, machine learning model, or other suitable model. The model may predict, with a relatively high degree of accuracy, which data among the data is sensitive, and do so in significantly less time, significantly less cost, and significantly fewer computing resources than it would take to actively scan all of the data. The model may then flag data which is predicted to be sensitive based on the model. In some examples, this may be accomplished without accessing the data itself.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown). Computing devices 110 shown in FIG. 1 may be in various locations, including a local computer, on premise, in the cloud, or the like. For example, computer devices 110 may be on the client side, on the server side, or the like.

As shown in FIG. 1, network 130 can include one or more network nodes 120 that interconnect multiple computing devices 110, and connect computing devices 110 to external network 140, e.g., the Internet or an intranet. For example, network nodes 120 may include switches, routers, hubs, network controllers, or other network elements. In certain examples, computing devices 110 can be organized into racks, action zones, groups, sets, or other suitable divisions. For example, in the illustrated example, computing devices 110 are grouped into three host sets identified individually as first, second, and third host sets 112a-112c. In the illustrated example, each of host sets 112a-112c is operatively coupled to a corresponding network node 120a-120c, respectively, which are commonly referred to as "top-of-rack" or "TOR" network nodes. TOR network nodes 120a-120c can then be operatively coupled to additional network nodes 120 to form a computer network in a hierarchical, flat, mesh, or other suitable types of topology that allows communications between computing devices 110 and external network 140. In other examples, multiple host sets 112a-112c may share a single network node 120. Computing devices no may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 110 may be individually configured to provide computing, storage, and/or other suitable computing services.

In some examples, one or more of the computing devices 110 is a device that is configured to be at least part of a process for data sensitivity estimation.

Illustrative Computing Device

Figure 2:
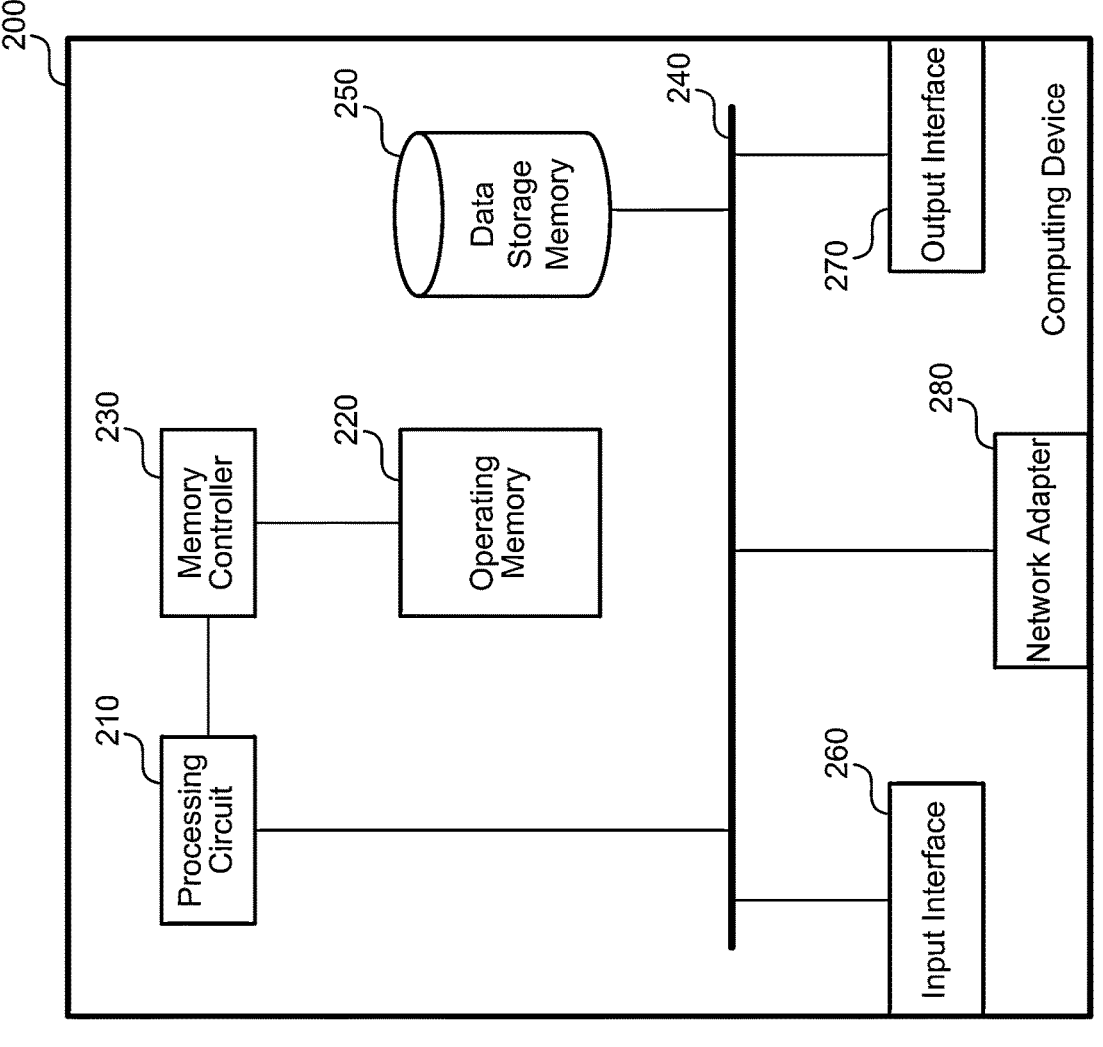
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, or a smartphone. Likewise, computing device 200 may also be a server device such as an application server computer, a virtual computing host computer, or a file server computer, e.g., computing device 200 may be an example of computing device no or network node 120 of FIG. 1. Likewise, computer device 200 may be an example any of the devices, a device within any of the distributed systems, illustrated in or referred to in any of the following figures, as discussed in greater detail below. As illustrated in FIG. 2, computing device 200 may include processing circuit 210, operating memory 220, memory controller 230, bus 240, data storage memory 250, input interface 260, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, and/or technology. Processing circuit 210 may include a microprocessor, a microcontroller, a graphics processor, a coprocessor, a field-programmable gate array, a programmable logic device, a signal processor, and/or any other circuit suitable for processing data. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, and/or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process. In some examples, other forms of execution may be employed, such as execution directly from data storage component 250, e.g., eXecute In Place (XIP).

Operating memory 220 may include 4$^{th}$ generation double data rate (DDR4) memory, 3$^{rd}$ generation double data rate (DDR3) memory, other dynamic random access memory (DRAM), High Bandwidth Memory (HBM), Hybrid Memory Cube memory, 3D-stacked memory, static random access memory (SRAM), magnetoresistive random access memory (MRAM), pseudorandom random access memory (PSRAM), and/or other memory, and such memory may comprise one or more memory circuits integrated onto a DIMM, SIMM, SODIMM, Known Good Die (KGD), or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as a single memory controller separate from processing circuit 210, in other examples, multiple memory controllers may be employed, memory controller(s) may be integrated with operating memory 220, and/or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although FIG. 2 illustrates bus 240 as a single passive bus, other configurations, such as a collection of buses, a collection of point-to-point links, an input/output controller, a bridge, other interface circuitry, and/or any collection thereof may also be suitably employed for interfacing data storage memory 250, input interface 260, output interface 270, and/or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, and/or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing. In yet another example, input interface 260 and/or output interface 270 may include a universal asynchronous receiver/transmitter (UART), a Serial Peripheral Interface (SPI), Inter-Integrated Circuit (I2C), a General-purpose input/output (GPIO), and/or the like. Moreover, input interface 260 and/or output interface 270 may include or be interfaced to any number or type of peripherals.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 28o may also include a wireless network adapter, for example, a Wi-Fi adapter, a Bluetooth adapter, a ZigBee adapter, a Long-Term Evolution (LTE) adapter, SigFox, LoRa, Powerline, or a 5G adapter.

Although computing device 200 is illustrated with certain components configured in a particular arrangement, these components and arrangements are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Figure 5:
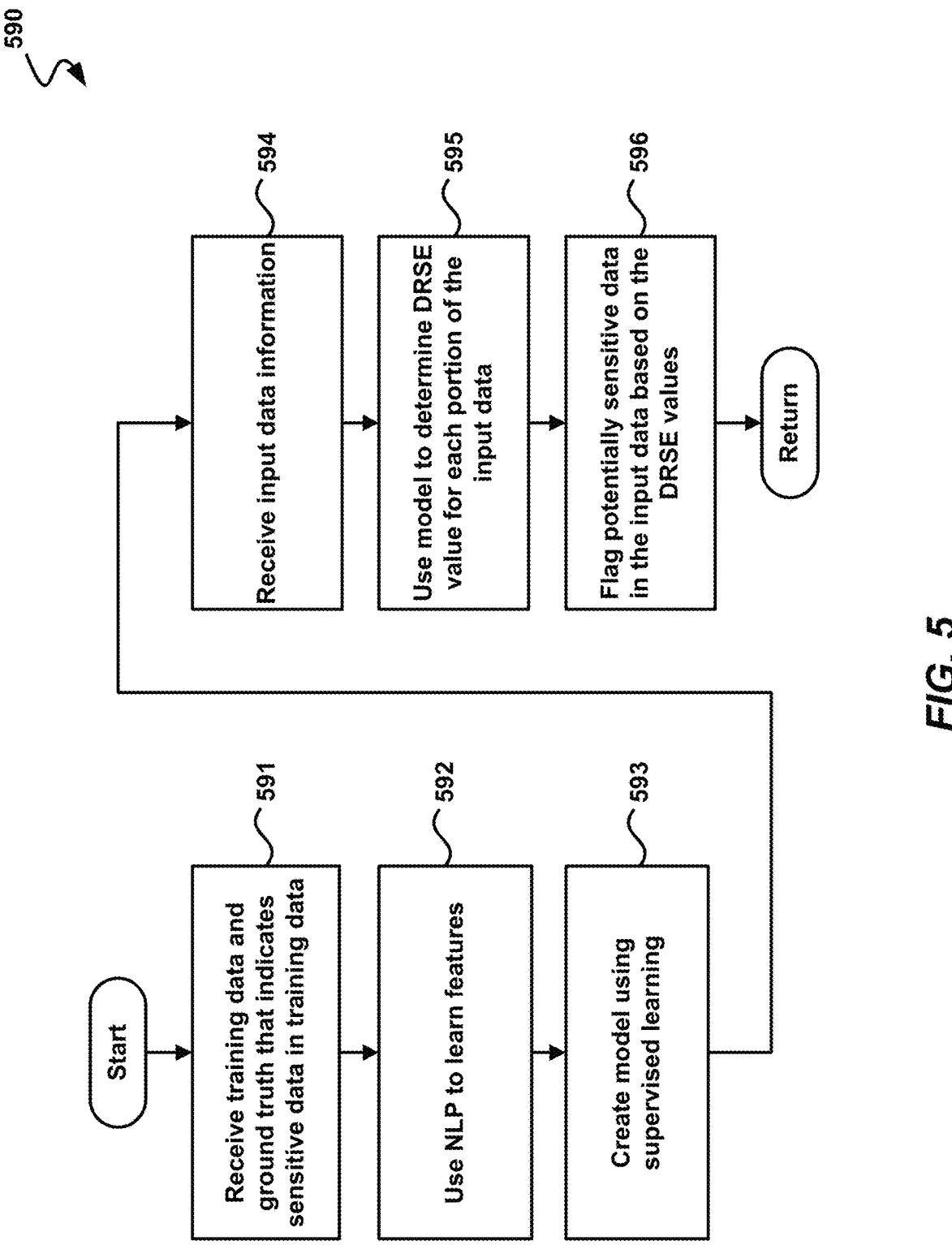
FIG. 5 is a flow diagram illustrating an example process for data sensitivity estimation, in accordance with aspects of the disclosure.

Some examples of computing device 200 include at least one memory (e.g., operating memory 220) having processor-executable code stored therein, and at least one processor (e.g., processing unit 210) that is adapted to execute the processor-executable code, wherein the processor-executable code includes processor-executable instructions that, in response to execution, enables computing device 200 to perform actions, where the actions may include, in some examples, actions for one or more processes described herein, such as the process shown in FIG. 5, as discussed in greater detail below.

Illustrative Systems

Figure 3:
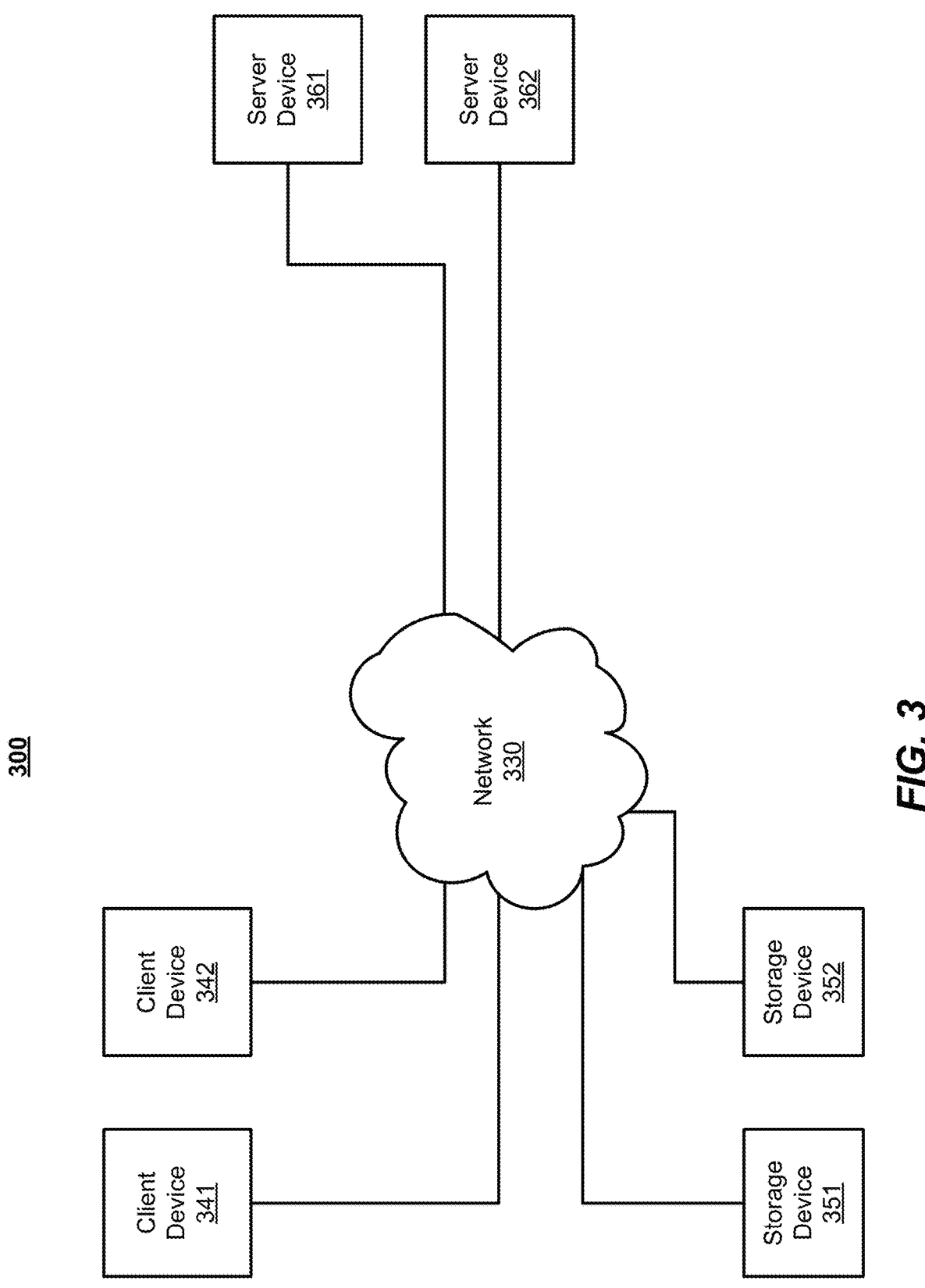
FIG. 3 is a block diagram illustrating an example of a network-connected system.

FIG. 3 is a block diagram illustrating an example of a system (300). System 300 may include network 330, as well as client devices 341 and 342; storage devices 351 and 352; and server devices 361 and 362, which, in some examples, all connect to network 330.

Each of client devices 341 and 342; storage devices 351 and 352; and server devices 361 and 362 may include examples of computing device 200 of FIG. 2. FIG. 3 and the corresponding description of FIG. 3 in the specification illustrate an example system for illustrative purposes that does not limit the scope of the disclosure. In some examples, server devices 361 and 362 are each part of one or more distributed systems.

In some examples, storage devices 351 and 352 provide data storage. In some examples, server devices 361 and 362 may be part of one or more distributed system(s) that provide various services. In some examples, the services provided by the distributed system(s) that includes server devices 361 and 362 may include the management of cloud storage in storage devices (e.g., storage devices 351 and 352), data sensitivity estimation services, and/or the like.

Network 330 may include one or more computer networks, including wired and/or wireless networks, where each network may be, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, and/or other communications links known to those skilled in the art. Furthermore, remote computers and other related electronic devices could be remotely connected to either LANs or WANs via a modem and temporary telephone link. Network 330 may include various other networks such as one or more networks using local network protocols such as 6LoWPAN, ZigBee, or the like. In essence, network 330 may include any suitable network-based communication method by which information may travel among client devices 341 and 342; storage devices 351 and 352; and server devices 361 and 362. Although each device is shown connected as connected to network 330, that does not necessarily mean that each device communicates with each other device shown. In some examples, some devices shown only communicate with some other devices/ services shown via one or more intermediary devices. Also, although network 330 is illustrated as one network, in some examples, network 330 may instead include multiple networks that may or may not be connected with each other, with some of the devices shown communicating with each other through one network of the multiple networks and other of the devices shown instead communicating with each other with a different network of the multiple networks. In some examples, client devices 341 and 342 do not communicate with storage devices 351 and 352 directly, but instead can communicate with storage devices 351 and 352 through server devices such as server device 361 and server device 362.

In some examples, the distributed system(s) that includes server devices 361 and 362 may include data sensitivity estimation for data storage in the storage devices. In some examples, the data sensitivity estimation may be performed by a data sensitivity estimation model. In some examples, a determination as to which data among the data input to the model is sensitive may be made by the data sensitivity estimation model. The data sensitivity may be a heuristic model, machine learning model, or other suitable model. The model may predict, with a relatively high degree of accuracy, which data among the data is sensitive, and do so in much less time than it would take to actively scan all of the data. The model may then flag data which is predicted to be sensitive based on the model. In some examples, this may be accomplished without accessing the data itself.

System 300 may include more or less devices than illustrated in FIG. 3, which is shown by way of example only.

Figure 4:
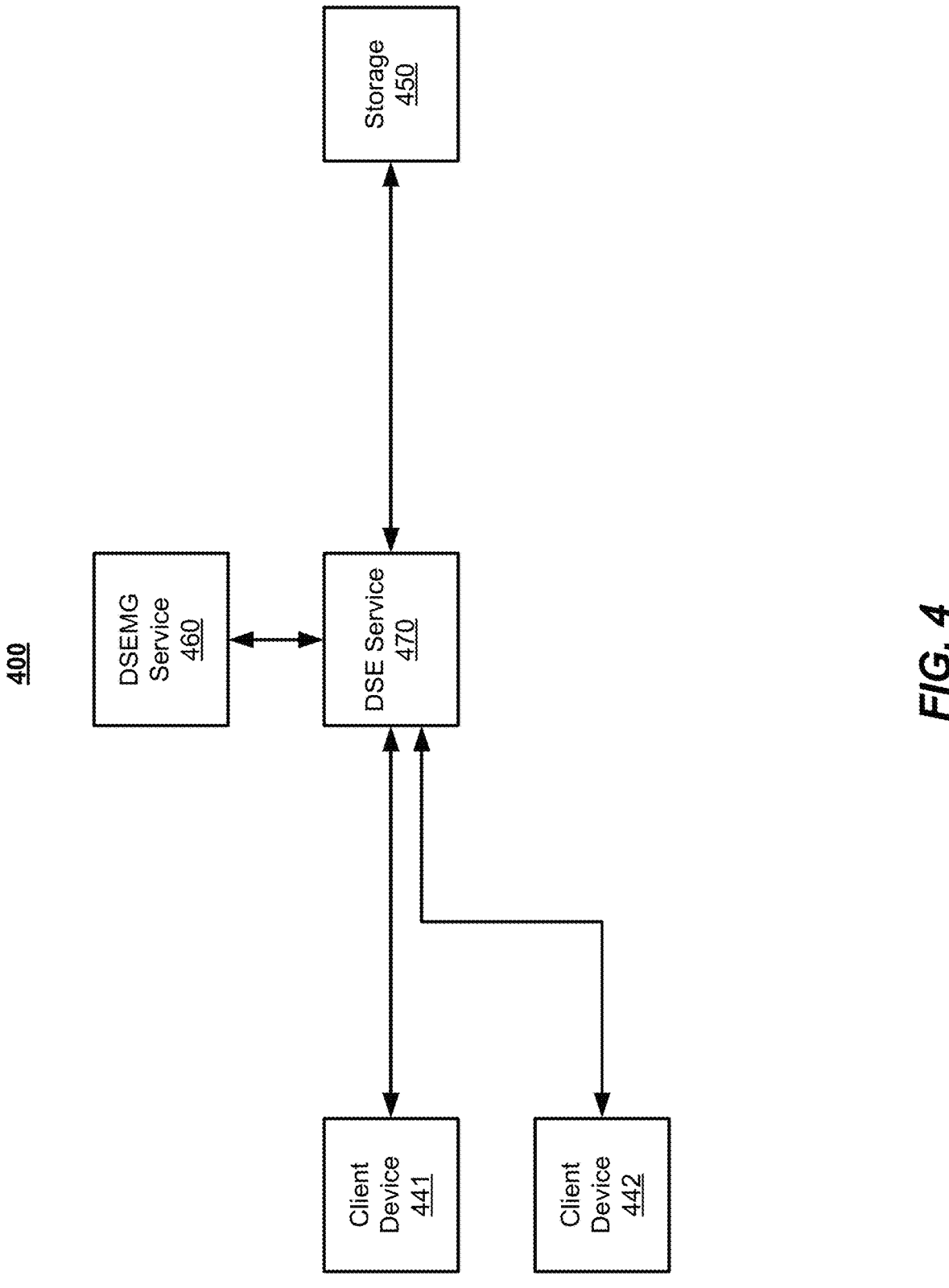
FIG. 4 is a block diagram illustrating an example of a system for data sensitivity estimation.

FIG. 4 is a block diagram illustrating an example of a system (400). System 400 may be an example of a portion of system 300 of FIG. 3. System 400 may be a system for data sensitivity estimation. System 400 may include client device 441, client device 442, storage 450, data sensitivity estimation model generation (DSEMG) service 460, and data sensitivity estimation (DSE) service 470. Client devices 441 and 442 may be examples of client devices 341 and 342 of FIG. 2.

In some examples, data sensitivity estimation model generation service 460 and data sensitivity estimation service 470 may be examples of server devices 361 and 362 of FIG. 3) and/or one or more distributed systems. In some examples, data sensitivity estimation model generation service 460 and data sensitivity estimation service 470 may each be included in the same distributed system. In some examples, data sensitivity estimation model generation service 460 and data sensitivity estimation service 470 may be in separate distributed systems.

In some examples, storage 450 may include one or more storage devices, which may be examples of storage devices 351 and 352 of FIG. 3. Storage 450 may provide storage for one or more clients. Clients may use client devices, such as client devices 441 and 442, to perform functions associated with storage for the client, including providing data to be stored, requesting access to stored data, requesting data sensitivity estimation for data for the client that is stored in storage 450, and/or other suitable functions. Storage 450 may further include server query language (SQL) storage and the like.

In some examples, data sensitivity estimation model generation service 460 creates a data sensitivity estimation model. In some examples, data sensitivity estimation model generation service 460 receives a considerable amount of input training data and a ground truth for the input training data. The ground truth for the input training data may labels that indicate which data from among the input training data is sensitive and which data from among the input training data is not sensitive. In some examples, the ground truth may also indicate, for data that is sensitive, a category of sensitivity. For instance, data may be categorized as to whether or not the data is sensitive medical data, whether or not the data is sensitive financial data, or the like. In other examples, the ground truth does not indicate categories of sensitivity of data, and instead simply indicates whether data is sensitive or not.

The input training data and corresponding ground truth may be provided in different ways in different examples. In some examples, a considerable amount of data may have been scanned for sensitivity among multiple clients in order to determine which data among the data is sensitive, which may in turn be used as the input training data and corresponding ground truth. In some examples, the model is created based on a combination of features in the input training data using a supervised learning method. Through the specification and the claims, the term "supervised learning" includes semi-supervised learning.

In some examples, various features are determined from the input training data, and then a model may be generated based on the combination of features, where a naming feature that is associated with the naming of the data resource is at least one of the features in the combination of features. In some examples, the naming feature is based on natural language processing used on the name of the data resource. In some examples, there is various pre-processing including the learning of features, and then the model will be created based on supervised learning after the features have been learned. In some examples, natural language processing and other suitable techniques may be used in the learning the features.

A variety of properties associated with a file may be used as features. For instance, properties of a file or other entity such as the name, size, type, or suffix of the entity may be used. Also, properties associated with the file (or other entity) that are not part of the file itself, such as traffic associated with the file, access policies for the file, other authentication patterns associated with the file, and/or the like, may be used as features. Also, various properties associated with the organization to which the file belongs, such as the industry of the organization, the language used by the organization, and the like may be used. Naming conventions have different meanings according to the business type (e.g., "logs" in a software context often mean non-sensitive machine logs, while in a medical context they mean sensitive patient visits information), language settings (same words have different meanings in different languages), and/or the like. Accordingly, business type, language settings, and/or the like may be used for features.

In some examples, for each portion of the data in which analysis is to be performed, such as for each file in the data, a score referred to as the data resources sensitivity estimator (DRSE) value is determined. As discussed above, data resources other than files may also be used. In some examples, the DRSE value is a probability by which the model predicts that the portion of data is sensitive. In other examples, the DRSE value is not a probability, but is a value that represents a relative confidence that the portion of data is sensitive. In some examples, a threshold value of the DRSE value is determined, and any portion of data for which the DRSE value exceeds the threshold value is predicted to be sensitive by the model. In some examples, the heuristic model may be validated in a test environment.

In some examples, the model may be a probabilistic model. For example, if 90 out of 100 files that include a particular feature are sensitive, then it may be determined that a file that has that feature is 90% likely to be sensitive. However, in various example, a combination of features may be used, so that one feature alone does not determine the final probability; instead, the probability may be determined based on multiple features. Additional, different features may be weighted relative to each other in various ways in different examples.

For instance, in some examples, a feature that has a larger sample size may be given greater weight. For instance, if one feature is based on 1,000 files and another feature is based on 100 files, the feature that is based on 1,000 files may be given more weight than the feature that is based on 100 files. Various other examples may be used to determine the relative weight to give to various probabilities determined for various feature in various examples. The model may determine a final metric to predict the probability that a particular portion of data is sensitive based on a combination of all applicable features. The probability is used as the DRSE score for the model in these examples.

A probabilistic model is one example of a type of heuristic model that may be used as the data sensitivity estimation model. Various heuristic models may make use of decision trees, logistic regression, support vector machines (SVMs), and/or other suitable supervised classification techniques. In other examples, other suitable types of heuristic models may be used.

One specific example of a probabilistic model is given below. This is a specific example given for exemplary purposes that does not limit the scope of the disclosure, and many other suitable examples of probabilistic models may also be used in other examples. In this example, a DRSE is used that estimates the probability that a resource contains sensitive data according to a set of insights. The client may create a set of labels (rank and type of sensitivity) for their data resources. A classifier model is generated, e.g., for predicting the labels based on a number of features of these data resources. The classifier may use a supervised classification technique such as decision trees, logistic regression, or SVMs. The features may include, for example, naming conventions (such as using specific keywords representing the content), access policies (such as limiting access for sensitive resources using strict firewall rules and strong authentication), and resource owner properties (such as business type, regional/language settings, etc.).

After learning the features, the features can be extracted and extrapolated for users and resources that still have not onboarded data classification. For example, common applications can use recurring keywords to name resources containing sensitive data. The model uses a combination of different features, as discussed above. The implementation of DRSE is, in this example, an extendable black box approach that does not require client input. The model estimates the sensitivity status of data using heuristic modeling based on a number of input types. Potential inputs of the model are: Entity name (e.g. "backup", "payslip-2021" etc.), Entity region (e.g. "north US", "France", "Germany" etc.), Organizations' industry (e.g. "medical", "retail" etc.), Entity traffic (e.g. "10 TPS (transaction per second)", "exposed to external customers", etc.).

After building the predictive model, the model may be used on input data to predict which data in the input data is sensitive. The model receives the input and determines DRSE using logistic transformation of 2 parameters—(1) probability of receiving sensitive label based on features as described above, and (2) support, which is the number of different resources sharing the features. Accordingly, DRSE is received for feature values that correlate well with sensitive status across a large number of instances. The model is then capable of extracting the relevant features from input data and the heuristically flagging potentially sensitive data in the input data.

As discussed above, in some examples, the data sensitivity model is a heuristic model. In other examples, the data sensitivity model is a machine learning model. In some examples, the machine learning model may use neural networks. In some examples, the machine learning model is created using the input training data and the ground truth based on supervised learning using a combination of features in the input training data. The machine learning model may be created based on features of the input training data as discussed in greater detail above.

As discussed above, in some examples, the model is created such that the data sensitivity estimation is done for two or more categories of data sensitivity, such as sensitive medical data, sensitive financial data, or the like, with a separate determination for each portion of data as to whether the portion is predicted to be sensitive for that category. In other examples, the model is created such that the data sensitivity estimation determines, for each portion of data, whether the data is sensitive, without identifying a particular category of sensitivity.

As discussed above, data sensitivity estimation model generation service 460 may create a data sensitivity estimation model. Clients may then request data sensitivity estimation for some or all of the client's data stored in storage 450, and may also include data stored elsewhere in some examples. In some examples, the data sensitivity estimation may be performed for any data resource of the client, where "data resource" refers to any resource that aims to store information, including for example storage (such as an account or container) or SQL entity (such as a server or database).

In some examples, the client may request data sensitivity estimation for all of the client's data, or some subset of the data of interest in the client. In some examples, the client may have a one-time scan of the data performed, or a periodic scan of the data performed, but may request data sensitivity estimation in order to determine potentially sensitive data that may be in the client's data since the last scan was performed. A client may also request data sensitivity estimation prior to performing a first scan. In this way, in some examples, the data sensitivity estimation is fully integrated into full data classification package as initial or intermittent step, or may be used as an alternative to full data classification. The model may be created based on a large amount of input training data, but the model may be used by clients even if none of the input training data used to create the model includes data from those clients.

Upon receiving a request for data sensitivity estimation, data sensitivity estimation service 470 may then perform the data sensitivity estimation using the data sensitivity estimation model. The data sensitivity estimation service 470 may retrieve information concerning the input data for which data sensitivity estimation has been requested, and then apply the model. The model may determine a DRSE value for each portion of the input data (e.g., each file in the input data), and then flag each portion of the input data for which the DRSE value exceeds a threshold as potentially being sensitive data. As discussed above, data resources other than files may also be used. In some examples, the data sensitivity estimation is accomplished without providing access to the data itself.

As discussed above, in some examples, the data sensitivity estimation is done for two or more categories of data sensitivity, such as sensitive medical data, sensitive financial data, or the like, with a separate determination for each portion of data as to whether the portion is predicted to be sensitive for that category. In other examples, the data sensitivity estimation determines, for each portion of data, whether the data is sensitive, without identifying a particular category of sensitivity.

The client may perform various actions based after the data sensitivity. For example, the client may use the data sensitivity prediction to limit access to portions of data predicted to be sensitive, to monitor traffic to portion of data predicted to be sensitive, or for other suitable actions. The data sensitivity estimation may allow organizations to improve data security, understand where sensitive resources are located, alert the organization's investigations of data resources, to prioritize issues such as misconfigurations and compliance risks in a multi-cloud data estate accordingly, and to gain more context on the organization's cloud security posture management.

Although various examples discuss the use of data sensitivity estimation for data stored in the cloud, the data sensitivity estimation may also be used for other contexts, including data stored locally.

Illustrative Processes

FIG. 5 a diagram illustrating an example dataflow for a process (590) for data sensitivity estimation. In some examples, process 590 may be performed by an example of one or more server devices 361 and/or 362 of FIG. 3, by an example of data sensitivity estimation model generation service 460 and data sensitivity estimation (DSE) service 470 of FIG. 4, by an example of one or more of device 200 of FIG. 2, or the like.

In the illustrated example, step 591 occurs first. At step 591, in some examples, training data and a ground truth that indicates sensitive data within the training data is received. As shown, step 592 occurs next in some examples. At step 592, in some examples, based at least on the training data, natural language processing is used to learn a plurality of features. In some examples, the plurality of features includes a naming feature that is associated with names of data resources in the training data. As shown, step 593 occurs next in some examples. At step 593, in some examples, based at least on the training data and the ground truth, using supervised learning, a model that is at least one of a heuristic model or a machine learning model is created.

As shown, step 594 occurs next in some examples. At step 594, in some examples, input data information that is associated with input data is received. As shown, step 595 occurs next in some examples. At step 595, in some examples, the model is used to determine a data resource sensitivity estimator value for each portion of a plurality of portions of the input data. In some examples, the determination is based on the combination of features for the input data. As shown, step 596 occurs next in some examples. At step 596, in some examples, potentially sensitive data within the input data is flagged based on the determined data resource sensitivity estimator values. The process may then advance to a return block, where other processing is resumed.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. An apparatus, comprising:

a device including at least one memory having processor-executable code stored therein, and at least one processor that is adapted to execute the processor-executable code, wherein the processor-executable code includes processor-executable instructions that, in response to execution, enable the device to perform actions, including:

receiving training data and a ground truth that indicates sensitive data within the training data;

based at least on the training data, using natural language processing to learn a plurality of features, wherein the plurality of features includes a naming feature that is associated with names of data resources in the training data;

based at least on the training data and the ground truth, using supervised learning, creating a model that is at least one of a heuristic model or a machine learning model;

receiving input data information that is associated with input data;

using the model to determine a data resource sensitivity estimator value for each portion of a plurality of portions of the input data, wherein the determination is based on a combination of features for the input data;

flagging potentially sensitive data within the input data based on the determined data resource sensitivity estimator values;

identifying, using the model, resources that share the combination of features;

performing actions on the resources improving data security of the resources;

limiting access to the input data flagged as potentially sensitive data;

periodically using the model to determine potentially sensitive data added to the input data and flagging new input data as potentially sensitive data; and limiting access to the new input data flagged as potentially sensitive data.

2. The apparatus of claim 1, wherein the model is a machine learning model that uses neural networks.

3. The apparatus of claim 1, wherein the model is a heuristic model that is a probabilistic model.

4. The apparatus of claim 1, wherein the model is a heuristic model that uses at least one of decision trees, logistic regression, or support vector machines.

5. The apparatus of claim 1, wherein using the model to determine the data resource sensitivity estimator value for each portion of the plurality of portions of the input data is accomplished without accessing the input data itself.

6. The apparatus of claim 1, wherein the combination of features further includes at least one access policy that is associated with the plurality of portions.

7. The apparatus of claim 1, wherein the combination of features further includes at least one resource owner property that is associated with the plurality of portions.

8. The apparatus of claim 1, wherein the data resource sensitivity estimator value is at least one of a predicted probability that a portion of the input data is sensitive or a confidence score indicating a predicted relative confidence that the portion of the input data is sensitive.

9. The apparatus of claim 1, wherein the model further determines whether each portion of the plurality of portions of the input data is sensitive for a plurality of categories of sensitivity, and wherein flagging the potentially sensitive data includes indicating, for each category of sensitivity the plurality of categories of sensitivity, whether the portion of the input data is predicted to be sensitive according to that category of sensitivity.

10. A method, comprising:

receiving training data and a ground truth that indicates sensitive data within the training data;

based at least on the training data and the ground truth, using supervised learning, creating a model that is at least one of a heuristic model or a machine learning model;

receiving input data information that is associated with input data;

using the model to determine a data resource sensitivity estimator value for each portion of a plurality of portions of the input data, wherein the determination is based on a combination of features for the input data;

flagging potentially sensitive data within the input data based on the determined data resource sensitivity estimator values;

identifying, using the model, resources that share the combination of features;

performing actions on the resources improving data security of the resources;

monitoring traffic to the input data flagged as potentially sensitive data;

receiving a request for a data sensitivity estimation for a portion of input data;

using the model to determine the data sensitivity estimation for the portion of the input data; and monitoring the traffic to the portion of the input data flagged as potentially sensitive data by the model.

11. The method of claim 10, wherein the model is a machine learning model that uses neural networks.

12. The method of claim 10, wherein the model is a heuristic model that is a probabilistic model.

13. The method of claim 10, wherein the model is a heuristic model that uses at least one of decision trees, logistic regression, or support vector machines.

14. The method of claim 10, wherein the data resource sensitivity estimator value is at least one of a predicted probability that a portion of the input data is sensitive or a confidence score indicating a predicted relative confidence that the portion of the input data is sensitive.

15. A processor-readable storage medium, having stored thereon processor-executable code that, upon execution by at least one processor, enables actions, comprising:

receiving training data and labels that indicate sensitive data within the training data;

based at least on the training data, using natural language processing to learn a plurality of features, wherein the plurality of features includes a naming feature that is associated with names of data resources in the training data;

using supervised learning to generate a model, based at least on the training data and the label, such that the model that is at least one of a heuristic model or a machine learning model;

receiving input data information that is associated with input data;

using the model to calculate a score for each portion of a plurality of portions of the input data, wherein the calculation is based on a combination of features for the input data;

flagging, within the input data, data that is predicted to be sensitive based on the calculated scores;

identifying, using the model, resources that share the combination of features;

performing actions on the resources improving data security of the resources;

performing actions improving data security for the data predicted to be sensitive;

receiving a request for a data sensitivity estimation for the input data;

using the model to determine new potentially sensitive data in the input data since a prior use of the model; and performing the actions improving the data security for the new potentially sensitive data identified in the input data by the model.

16. The processor-readable storage medium of claim 15, wherein the model is a machine learning model that uses neural networks.

17. The processor-readable storage medium of claim 15, wherein the model is a heuristic model that is a probabilistic model.

18. The processor-readable storage medium of claim 15, wherein the model is a heuristic model that uses at least one of decision trees, logistic regression, or support vector machines.

19. The processor-readable storage medium of claim 15, wherein the score is at least one of a predicted probability that a portion of the input data is sensitive or a confidence score indicating a predicted relative confidence that the portion of the input data is sensitive.

\* \* \* \* \*